United States Patent Office 3,473,895
Patented Oct. 21, 1969

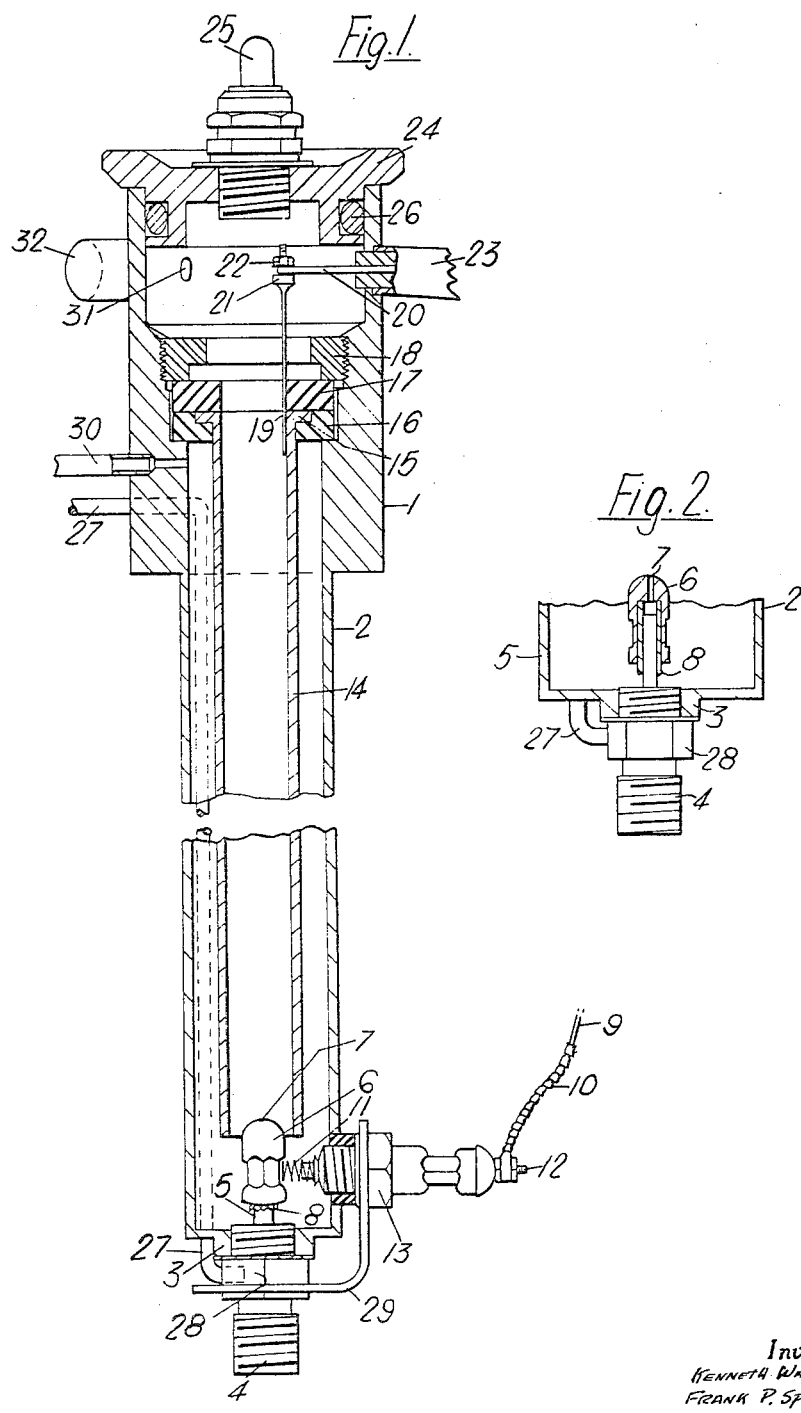

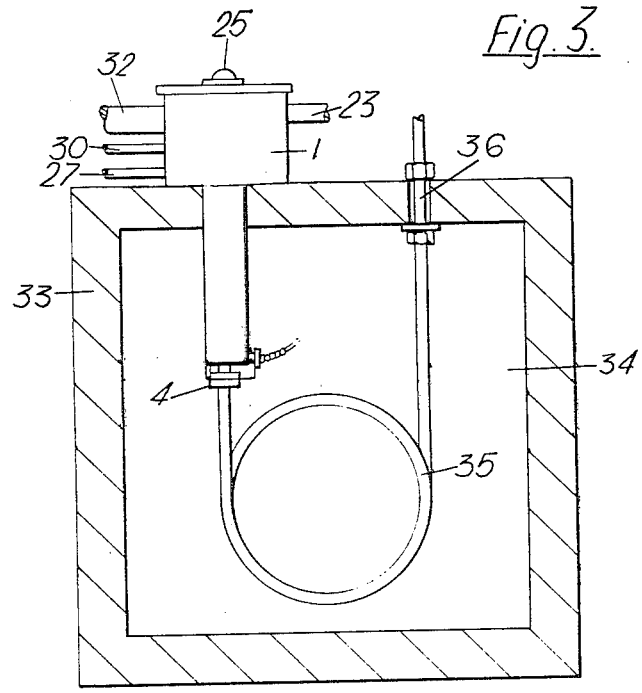
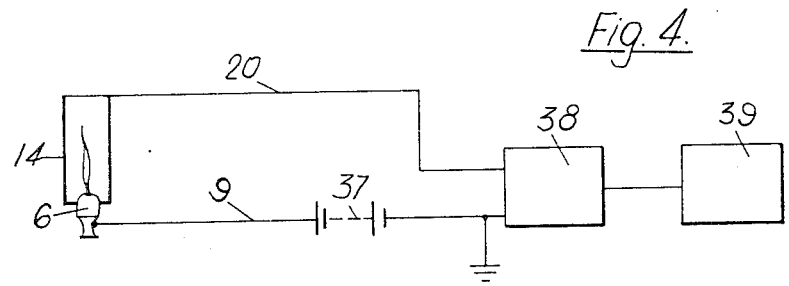
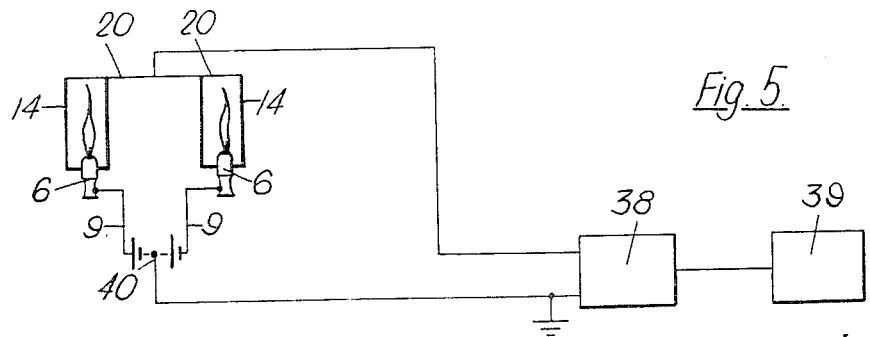

3,473,895
FLAME IONISATION DETECTORS
Kenneth Walter Brittan and Frank P. Speakman, Cambridge, England, assignors to Pye Limited, Cambridge, England, a British company
Filed Feb. 8, 1966, Ser. No. 525,971
Claims priority, application Great Britain, Feb. 9, 1965, 5,507/65
Int. Cl. G01n 31/00
U.S. Cl. 23—254                             9 Claims

ABSTRACT OF THE DISCLOSURE

A flame ionisation detector for use in gas chromatography. The detector comprises a burner coaxially arranged at one end of a tubular body which also supports a tubular electrode coaxially arranged within and electrically insulated from the tubular body. Means are provided to introduce air under pressure such that it flows down the space between the body and the tubular electrode, past the burner and up through the tubular electrode to an exhaust outlet.

---

The present invention relates to flame ionisation detectors for the detection and/or measurement of organic vapours or gases present in an inert inorganic gas. Such detectors are typically used in gas chromatography.

The operation of flame ionisation detectors is dependent upon the production of ions which occurs when organic molecules are burnt in a hydrogen flame. The number of ions formed is indicative of the quantity of the organic substance present and may be determined by applying a polarising potential between two electrodes in or adjacent the hydrogen flame and measuring the resulting current flow. In a practical construction of detector one of the two electrodes is commonly the jet from which the hydrogen flame issues and the other an electrode mounted in or close to the flame.

In chromatographic analysis the different components of the gas or vapour being analysed usually emerge from the fractionating column at times dependent upon their respective molecular weights. In order to speed the emergence of components of heavier molecular weight it is usual to hold the column at a stable temperature higher than room temperature or to raise the temperature of the column as the analysis proceeds, according to a predetermined temperature programme. In both these cases it is necessary for the detector to be raised to the same temperature as the column to prevent condensation of the organic vapours, which might otherwise occur if the detector were to be cooler than the column.

Prior art flame ionisation detectors have often been of bulky construction and as such have possessed a high thermal inertia preventing their being relatively rapidly temperature programmed. At the same time their bulky construction has meant that heat is too readily conveyed through the body of the detector causing, for example, deterioration of insulation and preventing successful high temperature operation.

It is a common practice to use two flame ionisation detectors together, one as a reference and the other as a measuring instrument, subtracting their respective outputs in an external circuit. For this purpose the jets are preferably insulated from the detector bodies. In the past attempts to electrically insulate the jet effectively have led to a substantial increase in thermal insulation, preventing the ready escape from the jet of heat due to the hydrogen flame and leading to thermionic emission of electrons from the jet at higher operating temperatures. Electron emission produces an increase of current in the external circuit connected between the electrodes meaning that the background current of the detector (that which flows with no organic substances present) increases with temperature, reducing the sensitivity of the instrument i.e. its ability to detect and measure small quantities of organic gas or vapour and complicating the accurate measurement of ionic current. Accurate measurement is also made more difficult by noise—instantaneous fluctuations of the current— which may be caused by insulation leakage, variations of air supply to the combination zone, chemical contamination of the inner body and electrodes of the detector et al.

One object of the present invention is the provision of an improved construction of flame ionisation detector.

According to the present invention a flame ionisation detector for the detection of organic gases or vapours comprises a tubular body closed at both ends, a burner mounted substantially coaxially within the tubular body at or adjacent one end thereof and serving as one electrode of the detector, a tubular electrode mounted substantially coaxially within the body but electrically insulated therefrom and means for introducing air at appropriate pressure into the space enclosed between the body and the tubular electrode at or adjacent the end of the body remote from the burner whereby air is enabled to move toward the burner through the said enclosed space and away from the burner through the tubular electrode.

In a preferred form of the invention the tubular electrode is mounted within the tubular body by means which serve also to electrically insulate it therefrom, the mounting means being preferably at or adjacent the end of the detector body remote from the burner, said electrode extending within the body such that at least part of the burner projects therein. The burner is preferably insulated from the detector body by means of a sleeve of glass fibres, and the detector body and tubular electrode made of stainless steel or other suitable inert metal.

The above and other features of the invention will be more readily understood by a perusal of the following description having reference to the accompanying drawings in which:

FIGURE 1 is a partly sectioned view of a flame ionisation detector according to the invention.

FIGURE 2 is a partly sectioned viewed of the burner assembly of the detector of FIGURE 1.

FIGURE 3 shows diagrammatically a flame ionisation detector such as that of FIGURE 1 mounted, together with a chromatograph column, in an oven and FIGURES 4 and 5 show diagrammatically circuitry associated with single and double detector arrangements for measuring ionic current.

Referring to FIGURES 1 and 2, a flame ionisation detector according to the invention comprises a body 1 of tubular form manufactured from stainless steel. The lower portion 2 of the body 1 has a wall of the order of 1/32" thick and a strengthened end wall 3 adapted to receive a pipe connector 4 suitable for a 1/16" diameter connecting pipe. The inner end of the pipe connector carries a pipe 5 upon which is crimped a burner cap 6 of stainless steel, having an orifice 7 of the order of 10 to 15 thousandths of an inch in diameter. The cap is electrically insulated from pipe 5 by means of a resin bonded glass fibre sleeve 8 a few thousandths of an inch thick.

Cap 6 which forms one electrode of the detector is electrically connected to lead 9, protected by insulating beads 10, via coiled spring 11 screwed upon rod 12 passing through bush 13 and electrically insulated therefrom. The whole assembly forms a gas tight seal.

The other of the detector electrodes is tube 14 which is mounted substantially coaxially with body 1 and jet 6 and constructed of stainless steel for 1/32" thick. Tube 14 is supported at its upper end by integral flange 15 seated within a recess in an electrically insulating annular washer 16 and held in place by a further insulating washer 17 and a screwed clamping ring 18. Washers 16 and 17 which may ideally be of P.T.F.E. material, seat upon a step in the inner wall of body 1. Electrical connection is made to electrode 14 through stud 19 spot welded thereto, the conductor of lead 20 being held tightly between shoulder 21 and lock-nut 22 upon the outer end of stud 19. The lead 20 passes out of the detector through a hole in the body wall into which is let a protective metal piping 23 of the same material as the body 1 i.e. stainless steel, and which also serves as an anti-microphonic strut for the detector.

The upper portion of body 1 is closed by means of a cap 24 carrying glow plug 25 whose electrical connections are not shown. A seal is effected by O ring 26.

Carrier gas, together with any organic gases or vapours which are present, enters the detector through connector 4 linked to the outlet of a chromatographic column. Hydrogen carried through capillary pipe 27 brazed into an inlet in hexagonal nut 28 combines with the effluent from the column and is ignited by glow-plug 25. Nut 28 is locked in position by bracket 29. Air enters the detector through pipe 30 let into the wall of body 1 directly below washer 16 and exhaust gases leave through aperture 31 connected to pipe 32.

The detector may conveniently be mounted through wall 33 of a hot air oven 34 such as is shown in FIGURE 3, the lower end of the detector being within the oven. The same oven also houses the chromatograph column 35, one end of which is coupled through connector 4 to the flame ionisation detector and the other end to a source of carrier gas and a sample injection chamber, through connector 36.

The electrodes of the detector are connected to external circuitry as shown in FIGURE 4 to enable the ionic current flow to be recorded. The circuit comprises a polarising battery 37 connected in series with the detector across the input of a D.C. amplifier 38 whose output is connected to indicating and/or recording means 39, which may conveniently be a conventional pen recorder.

A similar arrangement is shown in FIGURE 5 except that two similar detectors, mounted in close proximity and having common air and hydrogen feeds, are employed as measuring and reference elements respectively, being oppositely polarised by means of centre tapped polarising battery 40 such that fluctuations of current common to both cancel in the input circuit of D.C. amplifier 38.

The polarising potential for the detector described is preferably between 50 and 200 volts and the collector electrode may be made either negative or positive with respect to the burner. The dynamic range of the detector is enhanced at the higher polarising potential and is of the order of $10^6$.

By arranging that air enters the detector under slight pressure, a pressure gradient exists between air inlet 30 and exhaust outlet 31 ensuring a steady flow of air down the detector between the inner surface of body 1 and the outer surface of collector 14 and back up the detector through the inside of the collector. The advantages which accrue from this arrangement are:

(i) Collector insulation 16, in addition to being mounted in the coolest part of the detector, external to the oven, is continually cooled and purged by the incoming air stream ensuring the maintenance of very high insulation and a minimum of noise signals due to insulation leakage currents.

(ii) Passage of the air stream down the detector tends to prevent the ingress of gases to the space between body wall and collector and purges the surfaces of any chemical contamination which might occur and otherwise give rise to high background and noise levels.

(iii) The coaxial arrangement of the detector ensures that the air stream is directed all round the burner cap cooling it. The hydrogen flame is already extremely narrow owing to the small diameter of orifice 7, the intent being to reduce the transfer of heat from flame to jet to a minimum. The passage of air over the jet draws the flame out and further reduces the contact between it and the jet minimising the likelihood of thermionic emission from the burner cap through overheating, which would give rise to a high noise level and a variation of background current with temperature.

(iv) Passage of the air stream down the detector means that it is warmed and distributes evenly about the burner cap reducing background current variations otherwise occurring due to air supply fluctuations.

(v) In passing through the collector electrode products of combustion are carried towards outlet 31 and discouraged from settling and contaminating the inner surface of the collector.

By constructing the detector with a thin body wall a good surface area/mass ratio results, enabling the detector to follow changes in temperature relatively rapidly yet at the same time convey a minimum of heat to the collector insulation. It has been found, in practice, using stainless steel, that a body wall of 1/16" thick is excessive for this purpose. In order to reduce the temperature gradient along the body and collector electrode, further minimising heat flow towards the collector insulation, the body of the detector and collector electrode are made substantially longer than in prior art detectors and are, in a preferred embodiment, some 3 to 4 inches long.

The jet assembly described above also possesses low thermal inertia, being achieved largely by employing only a small bulk of electrical insulation between pipe 5 and cap 6. Heat may also escape more easily from the cap to the surrounding mass of metal than if a greater thickness of insulant is used. It has been found in practice that pipe connectors suitable for pipes of 1/8" diameter and greater are not suitable owing to their higher thermal inertia.

An additional advantage of the construction described herein is that by removing cap 24, disconnecting lead 20 and unscrewing ring 18, collector electrode 14 and insulating washers 16 and 17 may be withdrawn for inspection, cleaning or replacement without the need to disassemble the complete detector.

A detector such as that described above may be operated, with the lower portion within an oven, at up to 500° C. and may be programmed at rates of up to 50° C./minute up to some 300° C.

Although the detector herein described is constructed largely of stainless steel, any other inert metal able to withstand the highest operating temperatures may be used, or, alternatively, non-inert metals suitably plated with an inert metal.

We claim:

1. A flame ionisation detector for the detection of organic vapours or gases comprising a tubular metal body, a burner adapted to serve as one electrode of the detector and mounted substantially coaxially within said body at or adjacent one end thereof, a tubular metal electrode, means for mounting said tubular metal electrode substantially coaxially within said body including means electrically insulating said tubular metal electrode therefrom, said mounting means being located at or adjacent the end of the body remote from the burner, means for introducing air under pressure into the space enclosed between the body and the tubular electrode at or adjacent the end of the body remote from the burner so that the incoming air first cools and purges said mounting means for the tubular electrode, then moves towards the burner through the said enclosed space and away from the burner through the tubular electrode and means for exhausting the air comprising an outlet communicating with the interior of the tubular electrode at or adjacent the end remote from said burner.

2. A flame ionisation detector according to claim 1, in which at least part of the burner is located within said tubular electrode.

3. A flame ionisation detector according to claim 1, in which said mounting means for the tubular electrode comprises a flange on the end of said tubular electrode remote from said burner and electrically insulating means seated within the detector body and engaging with opposite sides of said flange.

4. A flame ionisation detector according to claim 1, in which the burner comprises a burner cap having an orifice, a pipe for supporting and supplying gas to said burner cap, a member of electrically insulating material between said burner cap and said pipe and means for making an electrical connection to the burner cap.

5. A flame ionisation detector according to claim 1, including a cover closing the end of the metal body remote from the burner, a glow plug extending through said cover, and means extending through and electrically insulated from the wall of the metal body for making an electrical connection to the tubular electrode.

6. A flame ionisation detector comprising
a tubular metal body,
a burner-electrode assembly,
means at one end of said tubular metal body for mounting said burner-electrode assembly substantially coaxially within said tubular metal body,
a tubular metal electrode,
means at the end of said body opposite said one end for mounting said tubular metal electrode substantially coaxially within said tubular metal body and in electrical isolation therefrom,
means for introducing air under pressure into the space enclosed between said body and said tubular electrode at the end of said body opposite said one end so that the incoming air first cools and purges the said mounting means for said tubular electrode, then moves towards the burner-electrode assembly through the said enclosed space and away from the burner, and
means for exhausting the air including an outlet communicating with the interior of the said tubular electrode at said opposite end for exhausting the air from said tubular metal body.

7. A flame ionisation detector as claimed in claim 6, wherein the said tubular metal body is made of stainless steel and has a wall thickness in the region of 1/32 inch.

8. A flame ionisation detector as defined in claim 6, wherein said tubular metal body is made from a relatively thin material having a surface area to mass ratio to enable the detector to rapidly follow changes in temperature by conveying heat through the thickness dimension thereof relatively rapidly and through the length dimension thereof relatively slowly.

9. A flame ionisation detector as defined in claim 8, wherein the body and the tubular metal electrode have a length of the order of 3 to 4 inches.

References Cited

UNITED STATES PATENTS 3,086,848 4/1963 Reinecke _____ 23—254
3,129,062 4/1964 Ongkiehong et al. ____ 23—255

OTHER REFERENCES

Bradley et al. "A Simple Flame Ionization Detector Cell," p. 606, vol 40, Journal of Scientific Instruments (1963).

JOSEPH SCOVRONEK, Primary Examiner

U.S. Cl. X.R.

23—255